F. F. SCHWEDA.
SCORING CARD.
APPLICATION FILED MAY 27, 1907.

906,745.

Patented Dec. 15, 1908.

| | Name and Rank | | | | | | | | | | | | | | | | | | | | | | | | | | | | | | 1907-7 1908-8 1909-9 |
|---|---|---|---|---|---|---|---|---|---|---|---|---|---|---|---|---|---|---|---|---|---|---|---|---|---|---|---|---|---|---|---|
| | Company | | | | | | | | | Regiment | | | | | | | | | | | | | | | | | | | | | |
| | X | | | | | | X | | | | | | | | X | | | | | | | | | | X | | | | | | |
| | O 4th. Class | | | | | | O 3rd. Class | | | | | | | | O 2nd. Class | | | | | | | | | | O 1st. Class | | | | | | |
| | X | | | | | | | | | X | | | | | | | | | | | | | | | X | | | | | | |
| | O Marksman | | | | | | | | | O Sharpshooter | | | | | | | | | | | | | | | O Expert | | | | | | |
| Skirmish | Timed fire | | 1000 | | | 800 | | | 600 | | | 500 | | | | 300 | | | | 200 | | | | | | | | | | | | |
| 6 | 1 | 30 | 18 | 23 | 25 | 18 | 23 | 25 | 18 | 23 | 25 | 18 | 23 | 25 | 16 | 18 | 23 | 25 | 16 | 18 | 23 | 25 | 16 | 18 | 23 | 25 | | | | | |
| 7 | 2 | 40 | 17 | 22 | 24 | 17 | 22 | 24 | 17 | 22 | 24 | 17 | 22 | 24 | 15 | 17 | 22 | 24 | 15 | 17 | 22 | 24 | 15 | 17 | 22 | 24 | | | | | |
| 8 | 3 | 50 | 16 | 21 | 23 | 16 | 21 | 23 | 16 | 21 | 23 | 16 | 21 | 23 | 14 | 16 | 21 | 23 | 14 | 16 | 21 | 23 | 14 | 16 | 21 | 23 | | | | | |
| 9 | 4 | 60 | 15 | 20 | 22 | 15 | 20 | 22 | 15 | 20 | 22 | 15 | 20 | 22 | 13 | 15 | 20 | 22 | 13 | 15 | 20 | 22 | 13 | 15 | 20 | 22 | | | | | |
| | 5 | 70 | 14 | 19 | 21 | 14 | 19 | 21 | 14 | 19 | 21 | 14 | 19 | 21 | 12 | 14 | 19 | 21 | 12 | 14 | 19 | 21 | 12 | 14 | 19 | 21 | | | | | |
| | | 80 | 13 | 18 | 20 | 13 | 18 | 20 | 13 | 18 | 20 | 13 | 18 | 20 | 11 | 13 | 18 | 20 | 11 | 13 | 18 | 20 | 11 | 13 | 18 | 20 | | | | | |
| | | 90 | 12 | 17 | 19 | 12 | 17 | 19 | 12 | 17 | 19 | 12 | 17 | 19 | 10 | 12 | 17 | 19 | 10 | 12 | 17 | 19 | 10 | 12 | 17 | 19 | | | | | |

WITNESSES:
Daniel E. Haly.
B. E. Brown

INVENTOR
Frank F. Schweda
BY
Lynch & Dorer
his ATTORNEYS,

THE NORRIS PETERS CO., WASHINGTON, D. C.

UNITED STATES PATENT OFFICE.

FRANK F. SCHWEDA, OF CLEVELAND, OHIO.

SCORING-CARD.

No. 906,745.     Specification of Letters Patent.     Patented Dec. 15, 1908.

Application filed May 27, 1907. Serial No. 375,907.

*To all whom it may concern:*

Be it known that I, FRANK F. SCHWEDA, a citizen of the United States of America, residing at Cleveland, in the county of Cuyahoga and State of Ohio, have invented certain new and useful Improvements in Scoring-Cards; and I hereby declare the following to be a full, clear, and exact description of the invention, such as will enable others skilled in the art to which it pertains to make and use the same.

This invention relates to new and useful improvements in record cards.

The object of this invention is to provide means for keeping an accurate and convenient record of the scores secured by the individual members of a military company during range practice.

My invention therefore consists in the new and improved features described hereinafter in the specification, pointed out in the claims and illustrated in the accompanying drawing.

In the drawing is shown a record card embodying my invention.

My invention consists essentially of a rectangular shaped card 1 which is preferably provided with perforations 2 at the left vertical edge so that a number of the cards can be secured together by a binder of any suitable description. The upper half of the card is divided by a series of horizontal lines 3 into spaces 4. In the spaces 4 are set forth the name and rank of the member of the company whose record is to appear on the card. Below the name of the member is indicated the name of the company to which the member belongs and the name of the regiment of which the company is a part. In the remaining spaces are set forth the designations or terms which are used to indicate the several grades of marksmanship in the United States Army, viz.—4th class, 3rd class, 2nd class, 1st class, marksman, sharpshooter and expert.

The lower half of the card is divided by double vertical lines in eight columns and each column is subdivided into spaces 8. At the head of each column is set forth a superscription indicating the conditions under which the score was made, viz., the word "Skirmish" is set forth at the head of one column indicating that the score was made during skirmish practice, at the head of another column is set forth the phrase "Timed fire" showing that the score was made under prescribed restrictions as to time consumed. At the head of the remaining columns are set forth the figures 1,000, 800, 600, 500, 300, 200, to indicate the distance in yards from the target. In each of the spaces in the columns are set forth numerals which range in duplicate series from a number indicating the lowest score which a member is expected to make to the highest score which it is possible to make in one firing.

The United States Army regulations require that each individual member comprising a military organization must be classified according to his ability in marksmanship, and for the purpose of properly grading the men according to their several abilities certain definite classes have been established and designated by the terms, fourth class, third class, second class, first class, marksman, sharpshooter, and expert. All the members of the company start from the lowest class and are only advanced to the next class after they have made a record in shooting equal to the prescribed record for that class. For instance a fourth class man must show a certain skill in the handling of a gun before he will be advanced to third class, and a third class man must show a certain skill before he will be advanced to the second class, and so on. The card illustrated does not afford opportunity for the permanent recording of the score of a fourth class man as it is not customary to keep a definite record of this class because regular practice soon qualifies a fourth class man as a third class man. Then for a third class man to be advanced to a second class man he must make in his practice a certain score at a certain distance and this distance according to the present United States Army regulations is two hundred yards from the target. The second class man to secure his advancement must make a prescribed score at three hundred yards. A first class man must make a prescribed score at five hundred yards before he can become a marksman, and a marksman must make a score at eight hundred yards together with a skirmish score before he can become a sharpshooter. Also the sharpshooter must make the prescribed score at a thousand yards together with the prescribed score in skirmish practice and the prescribed score in time fire before he can qualify as an expert.

In using my system one card is provided for each member of the company, but the cards are kept in the possession of a designated officer. On each card is then written the name and rank of the party whose record is to appear on the card, and the name of the company and regiment. In the upper right hand corner in the space provided therefor is then inscribed the index letter, and below this a series of years is set forth in duplicate, as 1907-7. Then to designate if the score was made in the winter time or on an indoor range the figures of the year towards the left hand are punched or otherwise canceled, and if it is wished to designate that the score was made on an outdoor range the figures of the year toward the right hand are punched or otherwise canceled. If the party to whom the card belongs is a third class man a punch mark is made at X over the designation third class on the card, and the man is then entitled to try for second class. After he has fired five consecutive scoring shots the total points made are punched in the column headed 200. Then when he has again fired five consecutive scoring shots at the same distance the total points made are again punched in the same column, and if the two scores together are sufficient to qualify the contestant for entrance to the next grade his card is punched at 0 before the designation 2nd class. The contestant is then entitled to try for first class, and the scores which he makes during his trial for first class are punched in a similar manner in the column headed 300. In this way a permanent record can be secured for each member of a company thereby doing justice to the contestants and also preventing any tampering with the records thereafter. Heretofore the scores of each member have been kept on separate tally sheets which were hastily made and were frequently lost or misplaced besides being at all times subject to being falsified by parties interested in changing the scores.

What I claim is:—

1. A score card for preserving a record of range practice having a portion thereof arranged to receive names to indicate the party whose name is recorded on the card and the company and regiment to which he belongs, also designations or terms indicating the grades of marksmanship through which the member must successfully pass to qualify in the highest, a space arranged on the upper left hand corner for receiving an index character, characters for indicating a duplicate series of years, a series of subdivisions in which are columns of figures to indicate the score secured by the member, such figures being used that the lowest and the highest in each subdivision will give the member the required qualification.

2. A score card for preserving a record of range practice having a portion thereof arranged to receive names or other designation to indicate the party whose record is recorded on the card, the company to which the party belongs and the regiment, also designations or terms indicating the grades of marksmanship through which the member must successively pass to qualify in the highest, a series of numbers arranged in columns, said numbers being so arranged that without extra numbers two numbers will be found which taken together will give the required score.

3. A score card for preserving a record of range practice having a portion thereof arranged to receive names or other designation to indicate the party whose record is recorded on the card also designations or terms indicating the grades of marksmanship through which the member must successively pass to qualify in the highest, a series of numbers arranged in columns, said numbers being arranged in twos so that the required score for any two strings of five shots each which will qualify a member may be punched thereon and headings arranged at the top of the respective columns to indicate the distance at which the score was made.

4. A score card having arranged thereon a series of columns of figures adapted to be punched for recording military range practice, said columns having at the top thereof the numbers 200, 300, 500, 600, 800 and 1000 yards respectively arranged in a horizontal line each heading under said hundreds designation respectively having arranged thereunder a series of vertical columns of figures arranged in combinations of the integers of all recordable scores of two strings of five shots whereby the highest or lowest score of recordable marksmanship in any particular predetermined class may be immediately computed and punched upon one and the same score card.

In testimony whereof, I sign the foregoing specification, in the presence of two witnesses.

FRANK F. SCHWEDA.

Witnesses:
VICTOR C. LYNCH,
DANIEL E. DALY.